United States Patent
Han et al.

(10) Patent No.: US 11,747,270 B2
(45) Date of Patent: Sep. 5, 2023

(54) FIRE DETECTION AND FEATURE EXTRACTION APPARATUS AND METHOD BASED ON DUAL OPTICAL WAVELENGTH

(71) Applicant: ELECTRONICS AND TELECOMMUNICATIONS RESEARCH INSTITUTE, Daejeon (KR)

(72) Inventors: Kyu Won Han, Daejeon (KR); Soo Cheol Kim, Daejeon (KR); Hyun Seok Kim, Daejeon (KR); Sang Hyun Mo, Daejeon (KR); So Yung Park, Daejeon (KR); Hoe Sung Yang, Daejeon (KR); Kang Bok Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/531,926

(22) Filed: Nov. 22, 2021

(65) Prior Publication Data

US 2022/0163443 A1    May 26, 2022

(30) Foreign Application Priority Data

Nov. 23, 2020  (KR) .................. 10-2020-0157882
Nov. 3, 2021  (KR) .................. 10-2021-0149913

(51) Int. Cl.
    *G01N 21/31*    (2006.01)
    *G01N 21/94*    (2006.01)
    *G08B 17/12*    (2006.01)

(52) U.S. Cl.
    CPC .............. *G01N 21/31* (2013.01); *G01N 21/94* (2013.01); *G08B 17/12* (2013.01); *G01N 2201/126* (2013.01)

(58) Field of Classification Search
    CPC ........ G01N 21/31; G01N 21/94; G01N 21/53; G01N 2201/126; G01N 2021/1789; G01N 2021/3129; G08B 17/12; G08B 17/107
See application file for complete search history.

(56) References Cited

U.S. PATENT DOCUMENTS 9,092,959 B2    7/2015    Kim et al.
9,898,911 B2    2/2018    Kim et al.
(Continued)

FOREIGN PATENT DOCUMENTS

JP    08-115480 A    5/1996
JP    2005-115970 A    4/2005
(Continued)

*Primary Examiner* — Tarifur R Chowdhury
*Assistant Examiner* — Carlos Perez-Guzman
(74) *Attorney, Agent, or Firm* — LRK PATENT LAW FIRM

(57) ABSTRACT

Optical data is collected from an optical sensor of a dual wavelength, and in order to detect the fire from the collected optical data, an average value of a first wavelength, an average value of a second wavelength, and a ratio of the average values of the two wavelengths are calculated, and an amount of change of a slope of the ratio is used to detect the fire and determine the fire occurrence time. From the determined fire occurrence time, fire features are extracted from the optical data in real time according to defined rules to configure a data set. The data set may be used for learning and inference techniques to identify a fire or non-fire, a fire source, a combustion material, and the like.

16 Claims, 4 Drawing Sheets

(56) References Cited

U.S. PATENT DOCUMENTS

| | | | | |
|---|---|---|---|---|
| 2018/0149590 A1* | 5/2018 | Erdtmann | ............... | G01N 21/53 |
| 2022/0099572 A1* | 3/2022 | Yu | ........................ | G08B 29/185 |
| 2022/0189273 A1* | 6/2022 | Xi | ........................... | G08B 25/04 |

FOREIGN PATENT DOCUMENTS

| | | |
|---|---|---|
| JP | 2016-114959 A | 6/2016 |
| KR | 10-1363276 B1 | 2/2014 |
| KR | 10-1720410 B1 | 3/2017 |
| WO | 2020/026589 A1 | 2/2020 |

* cited by examiner

FIG. 4

| LABEL | WAV_1_PTR_PEAK_RATE | WAV_2_PTR_PEAK_RATE | RATIO_PEAK | PEAK_TIME | STAB_TIME | ... |
|---|---|---|---|---|---|---|
| 410 | 420 | 430 | 440 | 450 | 460 | 470 |

FIRE DETECTION AND FEATURE EXTRACTION APPARATUS AND METHOD BASED ON DUAL OPTICAL WAVELENGTH

CROSS-REFERENCE TO RELATED APPLICATIONS

This application claims priority to and the benefit of Korean Patent Application Nos. 10-2020-0157882 filed on Nov. 23, 2020 and 10-2021-0149913 filed on Nov. 3, 2021, the disclosures of which are incorporated herein by reference in their entirety.

BACKGROUND

1. Field of the Invention

The present invention relates to technology for detecting whether a fire occurs, determining a fire occurrence time, and extracting fire features from optical data.

2. Description of Related Art

In currently used fire detection technology, since the concentration of smoke generated during a fire is measured to determine whether a fire occurs, detection errors can easily occur in non-fire situations such as dust, water vapor, smoke from daily activities, and the like. Specifically, as the installation of smoke detectors has become mandatory due to the revision of national fire safety standards, there is an advantage in that a fire is quickly detected, but due to 'a non-fire alarm', which operates by mistaking smoke from daily activities, water vapor, dust, and the like for a fire, there are serious problems such as frequent evacuation of residents, waste of firefighting power and, turning off fire receivers due to mistakes.

Further, since fire alarm errors occurring in industrial facilities cause direct property damage such as loss of equipment, products, infrastructure, and the like and indirect damage such as business interruption, or the like, damage from a non-fire alarm in addition to damage from a fire also increases.

SUMMARY OF THE INVENTION

Accordingly, a technology capable of accurately determining whether a fire or non-fire occurs by classifying vapor, dust, cigarette smoke, smoke from daily activities, and the like similar to smoke particles, and usable to identify the source of fire (cause of fire, type of fire, or the like) is proposed.

According to an aspect of the present invention, in order to solve the problems, the occurrence of a fire is detected from particles generated during a fire using light of a dual wavelength, and a fire feature is extracted through real-time signal processing from the detected fire occurrence time. To this end, optical data is collected from an optical sensor of a dual wavelength, a fire is detected from the collected optical data, and when the fire is detected, fire features are extracted from the optical data in real time to configure a data set.

In an optical data collection unit, the optical data output from the optical sensor is collected. An average value of a first wavelength, an average value of a second wavelength, and a ratio of the average values of the two wavelengths are calculated from the optical data, and an amount of change of a slope of the ratio is used to detect a fire and determine the fire occurrence time. From the determined fire occurrence time, fire features are extracted according to defined rules to configure a data set. The configured data set may be used for learning and inference techniques to classify a fire or non-fire, a fire source, and the like.

Configurations and actions of the present invention will become more apparent through specific embodiments described later in conjunction with the drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 4 is a configuration diagram of a data set generated by fire features extracted by the fire feature extraction unit.

DETAILED DESCRIPTION OF EXEMPLARY EMBODIMENTS

Advantages and features of the present invention, and a method of achieving them, will become apparent with reference to preferable embodiments which are described in detail in conjunction with the accompanying drawings. However, the present invention is not limited to the embodiments which will be described below and may be implemented in different forms. The embodiments are only provided to completely disclose the present invention and completely convey the scope of the present invention to those skilled in the art, and the present invention is defined by the disclosed claims. Further, terms used in the description are provided not to limit the present invention but to describe the embodiments. In the embodiments, the singular form is intended to also include the plural form unless the context clearly indicates otherwise. The terms 'comprise' and/or 'comprising' as used herein are used in the sense of not precluding the presence or addition of at least one other component, step, operation, and/or element other than the stated components, steps, operations and/or elements.

Hereinafter, preferable embodiments of the present invention will be described in detail with reference to the accompanying drawings. In the description of the embodiments, when detailed descriptions of related known components or functions may obscure the principle of the present invention, the detailed descriptions thereof will be omitted.

Figure 1:
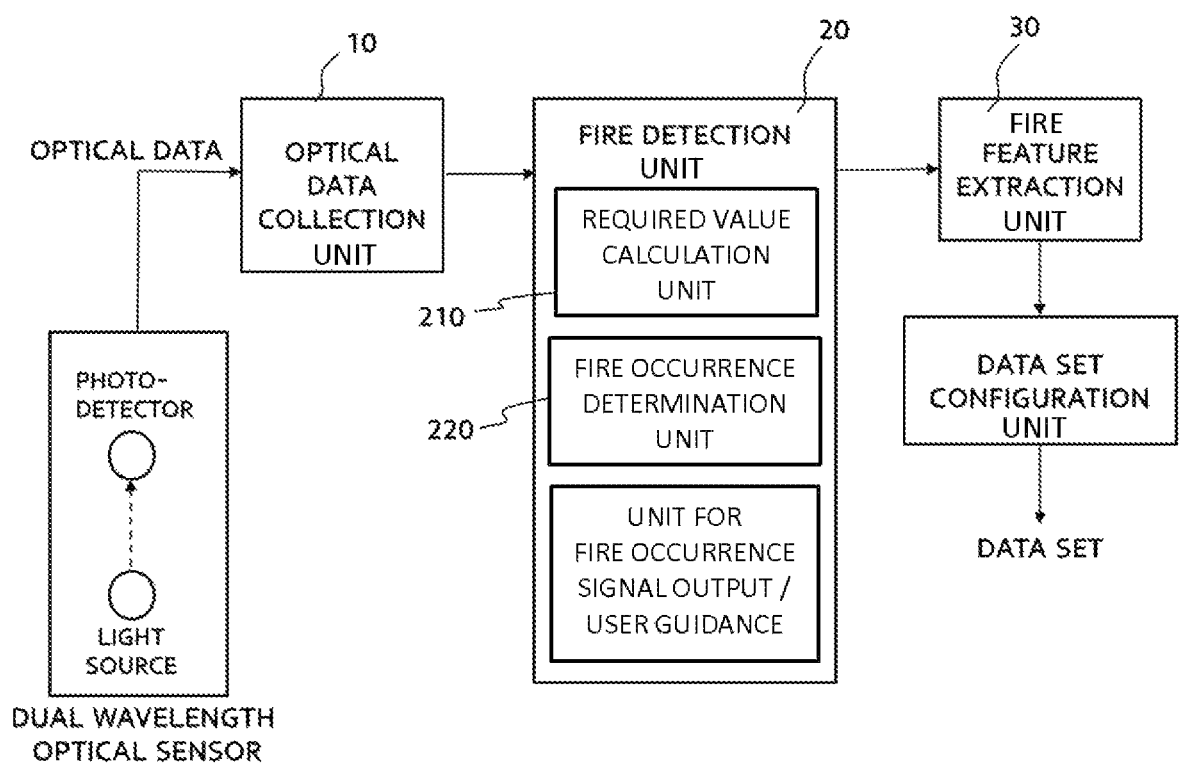
FIG. 1 is a block diagram illustrating a fire detection and feature extraction apparatus and a fire detection and feature extraction method based on a dual optical wavelength according to the present invention.

FIG. 1 is a block diagram illustrating a fire detection and feature extraction apparatus and method based on a dual optical wavelength according to an embodiment of the present invention.

Optical data is collected from an optical sensor using dual optical wavelengths (a first wavelength and a second wavelength) (10). A fire is detected from the collected optical data to determine whether the fire occurs (20). After the fire is detected and thus a fire occurrence time is determined, fire features are extracted from the optical data to generate a learning data set (30).

A unit for optical data collection (10) collects optical data output from the optical sensor. Here, the optical sensor is composed of a light source (multiple or single) which emits light of the dual optical wavelengths (the first wavelength and the second wavelength), and a photodetector which outputs the optical data by detecting light having a wavelength changed through optical actions such as scattering, reflection, refraction, and the like after the light of the dual optical wavelengths is irradiated to smoke particles. In a specific embodiment, the first wavelength is 470 nm of the blue light series, and the second wavelength is 850 nm of the infrared series.

For optical data collection, a window of size N (for example, 100 pieces of data) may be set up in a first-in-first-out (FIFO) manner.

Further, depending on embodiments, a unit which normalizes initial data output from the optical sensor before optical data collection may be included.

The first and second wavelengths and a ratio of these two wavelengths are calculated from the optical data collected by the unit for optical data collection (10) and used for fire detection and feature extraction (this will be described later).

A unit for fire detection (20) includes a required value calculation unit 210 which calculates a value required for fire detection from the optical data of the first wavelength and the second wavelength in an initial general state for the collected optical data, and a fire occurrence determination unit 220 which determines whether a fire occurs according to whether an amount of change of the calculated required value for fire detection exceeds a pre-defined threshold value.

More specifically, the required value calculation unit 210 calculates average values of the first wavelength and the second wavelength in the initial general state for the collected optical data, calculates a ratio of the average value of the second wavelength to the average value of the first wavelength, and firstly differentiates the calculated ratio value to convert the ratio value to an amount of change. Further, the fire occurrence determination unit 220 determines whether the fire occurs and the fire occurrence time according to whether an amount of change of the calculated average value of the first wavelength, an amount of change of the calculated average value of the second wavelength, or the amount of change of the ratio value exceeds the defined threshold value thereof.

Depending on embodiments, when the fire is detected in the unit for fire detection (20), a fire occurrence signal may be output or a user may be guided (warned).

Finally, a unit for fire feature extraction (30) extracts fire features from the fire occurrence time determined by the unit for fire detection (20) according to defined rules (which will described later). The extracted features will be described later with reference to FIGS. 3A, 3B, and 4.

A data set may be composed of the extracted features and used for learning and inference techniques to perform non-fire classification, fire source (cause of fire, type of fire, or the like) classification, combustion material prediction, and the like.

Figure 2A:
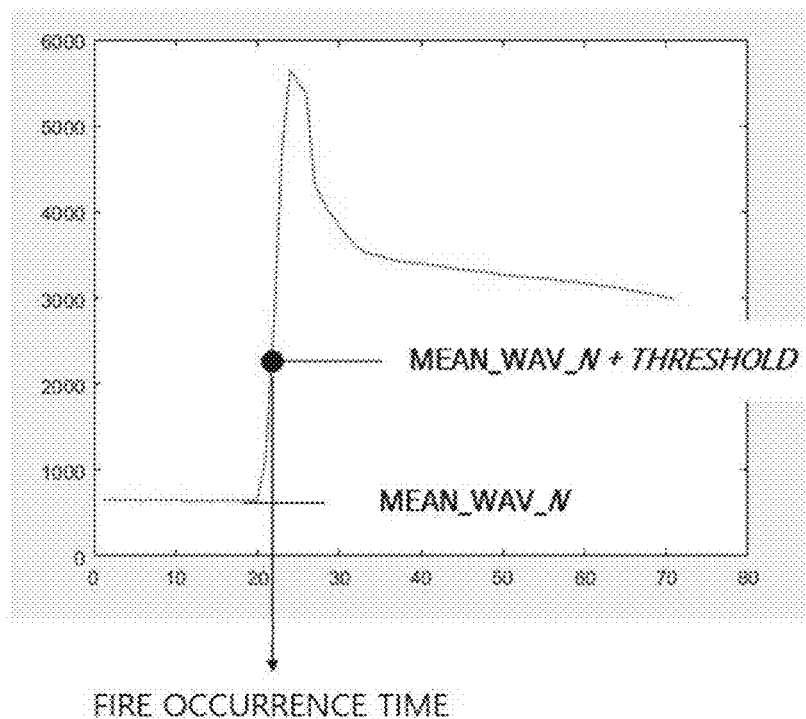
FIGS. 2A and 2B are graphs for describing a fire detection method of a unit for fire detection (20)
Figure 2B:
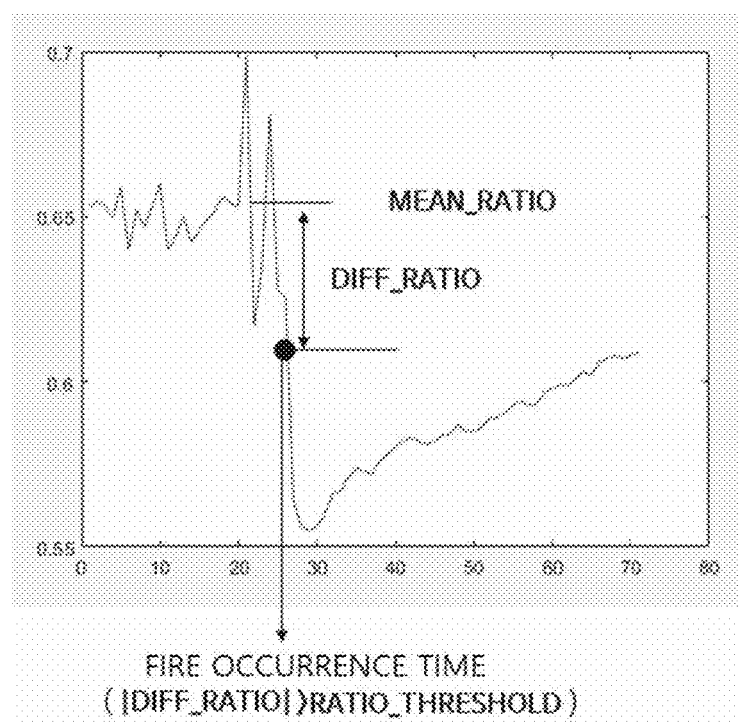

FIGS. 2A and 2B are graphs for describing a way of fire detection by the unit for fire detection (20). In FIG. 2A, a horizontal axis refers to time, and a vertical axis refers to the intensity of detected light; and in FIG. 2B, a horizontal axis refers to time, and a vertical axis refers to a ratio.

First, a case in which the fire is detected from the amount of change of the average value of the first wavelength or the amount of change of the average value of the second wavelength will be described with reference to FIG. 2A.

In execution of the fire detection 20, first, in the required value calculation unit 210, average values MEAN_WAV_1 and MEAN_WAV_2 of the wavelengths for each wavelength are calculated from the data of a predetermined time or a predetermined sample of the collected first and second wavelength optical data to calculate. Subsequently, in the fire occurrence determination unit 220, the occurrence of a fire is detected by comparing the calculated average values of the wavelengths with a predefined threshold value WAV_1_THRESHOLD or WAV_2_THRESHOLD to calculate whether the average values exceed the threshold value. Specifically, a time point (MEAN_WAV_N+THRESHOLD) at which MEAN_WAV_N (N=1 or 2) rises and becomes larger than the threshold value is determined as a fire occurrence time. That is, in FIG. 2A, the time point (MEAN_WAV_N+THRESHOLD) at which MEAN_WAV_N rises and becomes larger than the threshold value for each wavelength is determined as the fire occurrence time.

Next, a case in which a fire is detected from the amount of change in the ratio (wavelength value ratio) of the average value of the second wavelength to the average value of the first wavelength will be described with reference to FIG. 2B.

In the required value calculation unit 210, a wavelength value ratio MEAN_RATIO, which is the ratio of the average value of the second wavelength to the average value of the first wavelength calculated from the data of a predetermined time or a predetermined sample of the collected first and second wavelength optical data, is calculated and the MEAN_RATIO is firstly differentiated to calculate an amount of change of a slope. Subsequently, in the fire occurrence determination unit 220, the calculated amount of change of the slope is compared with a predefined threshold RATIO_THRESHOLD to detect the occurrence of a fire according to whether the amount of change of the slope exceeds the threshold value. Specifically, in FIG. 2B, a time t at which an absolute value of the differential value DIFF_RATIO of the MEAN_RATIO becomes greater than the RATIO_THRESHOLD (|DIFF_RATIO|>RATIO_THRESHOLD) is determined as the fire occurrence time.

In the case of FIG. 2A, when any one amount of change among the average value of the first wavelength, the average value of the second wavelength, and the ratio of the wavelength value in FIG. 2B exceeds the threshold value, it is determined that the fire occurs.

Figure 3A:
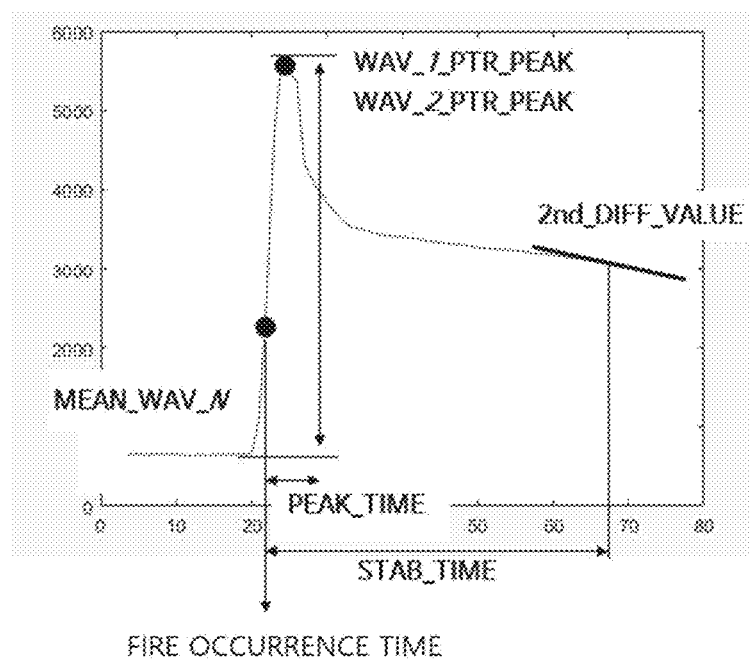
FIGS. 3A and 3B are graphs for describing a feature extraction method of a unit for fire feature extraction (30) for a case in FIGS. 2A and 2B.
Figure 3B:
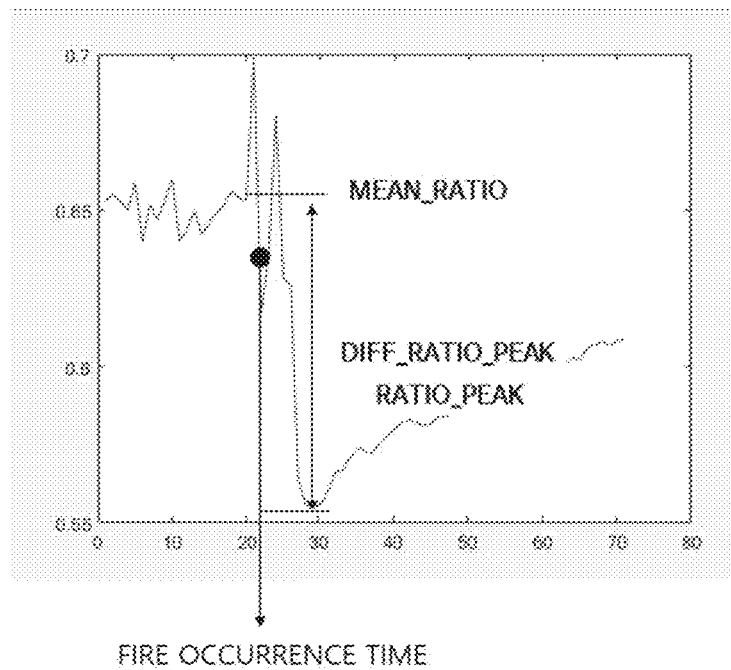

FIGS. 3A and 3B are graphs for describing feature extraction performed in the unit for fire feature extraction (30) after the determined fire occurrence time.

First, referring to FIG. 3A, a predefined window is created from the fire occurrence time determined by the unit for fire detection (20) in the above. Here, a window value may be either the number of samples or time. A maximum change value (peak) having the largest change value in the window is defined (defined as WAV_1_PTR_PEAK in the case of the first wavelength, and defined as WAV_2_PTR_PEAK in the case of the second wavelength).

'Maximum change value ratios' WAV_1_PTR_PEAK_RATE and WAV_2_PTR_PEAK_RATE of the first and second wavelengths which are values acquired by respectively dividing the maximum change values WAV_1_PTR_PEAK and WAV_2_PTR_PEAK by the average values MEAN_WAV_1 and MEAN_WAV_2 of the wavelengths calculated from the required value calculation unit 210 of the unit for fire detection (20) are defined as fire features.

The smaller among the time difference from the fire occurrence time to the time when the WAV_1_PTR_PEAK occurs and the time difference from the fire occurrence time to the time when the WAV_2_PTR_PEAK occurs is defined as 'a time until the maximum change value time' PEAK_TIME, which is another fire feature.

The time when the average value of the first wavelength and the average value of the second wavelength included in the optical data are secondarily differentiated and thus the absolute value of the amount of change of the slope is smaller than a predefined slope 2nd_DIFF_VALUE is defined as 'a stabilization time' STAB_TIME, which is still another fire feature. However, this stabilization time may not be used as a specific value when not defined within a predetermined time range from a fire detection time (that is, when the STAB_TIME is greater than the predetermined time range), and thus is excluded from the fire feature.

Further, as shown in FIG. 3B, a RATIO value having the largest change value in the window is defined as a RATIO_PEAK. That is, a maximum change value DIFF_RATIO_PEAK of an amount of change of the slope DIFF_RATIO calculated by firstly differentiating a wavelength value ratio MEAN_RATIO, which is the ratio of the average value of the second wavelength to the average value of the first wavelength, is defined as 'a maximum change value of the wavelength value ratio' RATIO_PEAK which is yet another fire feature.

FIG. 4 illustrates the data set composed of the fire features extracted by the unit for fire feature extraction (30). For a specific label 310, the maximum change value ratio of the first wavelength WAV_1_PTR_PEAK_RATE 420, the maximum change value ratio of the second wavelength WAV_2_PTR_PEAK_RATE 430, the maximum change value of the wavelength value ratio RATIO_PEAK 440, the time until the maximum change value time PEAK_TIME 450, and the stabilization time STAB_TIME 460 are attached to form the data set.

Here, a label 410 may be defined as a fire or non-fire, a cause of fire, a type of fire, or the like depending on embodiments.

Depending on embodiments, it is also possible to include a feature 470 other than the above-described features in the data set.

According to the present invention, a fire or non-fire can be accurately determined by configuring a data set with fire features extracted from a detection time of an actual fire to classify vapor, dust, cigarette smoke, smoke from daily activities, and the like similar to smoke particles using learning and inference techniques. Further, the present invention can be used to accurately determine a fire source such as a cause of fire, a type of fire, and the like, and can analyze smoke generated during a fire to predict combustion materials.

Although the present invention has been described in detail through preferable embodiments of the present invention, those skilled in the art may understand that the present invention may be embodied in specific forms other than contents disclosed in the specification without changing the technical spirit or essential features of the present invention. The above-described embodiments should be understood as being exemplary and not limiting. Further, the scope of the present invention will be indicated by the appended claims rather than the above-described detailed description, and all possible changes or modifications in forms derived from the scope of the claims and equivalents thereof should be understood as being within the scope of the present invention.

What is claimed is:

1. A fire detection and feature extraction apparatus, comprising:
one or more computer-executable units being configured and executed by a processor having instructions, the instructions, when executed, causing the processor to execute the one or more computer-executable units, the one or more computer-executable units comprising:
an optical sensor comprising,
a light source configured to emit light of a first wavelength and a second wavelength, and
a photodetector configured to output optical data by detecting light of a changed wavelength among the first and second wavelengths after the light of the first and second wavelengths is irradiated to smoke particles;
an optical data collection unit that collects the optical data output from the optical sensor;
a fire detection unit that calculates the first wavelength, the second wavelength, and a ratio of the two wavelengths from the optical data, and detects the occurrence of fire and determines a fire occurrence time according to whether an amount of change of the first wavelength, the second wavelength, or the ratio of the two wavelengths exceeds a defined threshold value; and
a fire feature extraction unit that extracts a fire feature from the determined fire occurrence time,
wherein the fire detection unit comprises:
a fire detection required value calculation unit that calculates a value required for the detection of the occurrence of fire by calculating an average value of the first wavelength and an average value of the second wavelength from the collected optical data, calculating a wavelength value ratio, which is a ratio of the average value of the second wavelength to the average value of the first wavelength, and differentiating the wavelength value ratio to calculate an amount of change of a slope; and
a fire occurrence time determination unit that determines the fire occurrence time by determining a time when the calculated average value of the first wavelength exceeds a predefined first threshold value as a fire occurrence time, determining a time when the calculated average value of the second wavelength exceeds a predefined second threshold value as a fire occurrence time, and determining a time when the calculated amount of change of the slope of the wavelength value ratio exceeds a predefined third threshold value as a fire occurrence time.

2. The apparatus of claim 1, wherein the fire occurrence time determination unit determines the fire occurrence time when only one of the average value of the first wavelength, the average value of the second wavelength, and the wavelength value ratio exceeds the first, second, and third threshold values.

3. The apparatus of claim 1, wherein the one or more computer-executable units further comprise a unit that performs at least one of output of a fire occurrence signal and a guidance to a user when the occurrence of fire is detected by the fire detection unit.

4. The apparatus of claim 1, wherein the fire feature extraction unit:
defines a maximum change value of the first wavelength and a maximum change value of the second wavelength comprised in the optical data, divides the maximum change value of the first wavelength by an average value of the first wavelength to extract a maximum change value ratio of the first wavelength as a first fire feature, and divides the maximum change value of the second wavelength by an average value of the second wavelength to extract a maximum change value ratio of the second wavelength as a second fire feature.

5. The apparatus of claim 1, wherein the fire feature extraction unit:

defines a maximum change value of the first wavelength and a maximum change value of the second wavelength comprised in the optical data, and extracts a time until a maximum change value time acquired by selecting the smaller among a time difference from the fire occurrence time to a time when the maximum change value of the first wavelength occurs and a time difference from the fire occurrence time to a time when the maximum change value of the second wavelength occurs as a third fire feature.

6. The apparatus of claim 1, wherein the fire feature extraction unit:

defines a maximum change value of the first wavelength and a maximum change value of the second wavelength comprised in the optical data, and differentiates an average value of the first wavelength and an average value of the second wavelength comprised in the optical data to extract a stabilization time, which is a time when an amount of change of a slope is smaller than a predefined slope threshold value, as a fourth fire feature.

7. The apparatus of claim 1, wherein the fire feature extraction unit:

defines a maximum change value of the first wavelength and a maximum change value of the second wavelength comprised in the optical data, and extracts a maximum change value of a wavelength value ratio calculated by differentiating a wavelength value ratio, which is a ratio of an average value of the second wavelength to an average value of the first wavelength comprised in the optical data, as a fifth fire feature.

8. The apparatus of claim 1, wherein the one or more computer-executable units further comprise a unit that generates a data set for learning and inference with a feature extracted from the fire feature extraction unit.

9. A fire detection and feature extraction method, comprising:

an optical data collection operation of collecting optical data from an optical sensor configured to output the optical data by detecting a changed wavelength of light after the light of a first wavelength and a second wavelength is emitted and irradiated to smoke particles;

a fire detection operation of calculating the first wavelength, the second wavelength, and a ratio of the two wavelengths from the optical data, and detecting the occurrence of fire and determining a fire occurrence time according to whether an amount of change of the first wavelength, the second wavelength, or the ratio of the two wavelengths exceeds a defined threshold value; and a fire feature extraction operation of extracting a fire feature from the determined fire occurrence time, wherein the fire detection operation comprises:

a fire detection required value calculation operation of calculating a value required for the detection of the occurrence of fire, by calculating an average value of the first wavelength and an average value of the second wavelength from the collected optical data, by calculating a wavelength value ratio, which is a ratio of the average value of the second wavelength to the average value of the first wavelength, and by differentiating the wavelength value ratio to calculate an amount of change of a slope; and a fire occurrence time determination operation of determining the fire occurrence time, by determining a time when the calculated average value of the first wavelength exceeds a predefined first threshold value as a fire occurrence time, by determining a time when the calculated average value of the second wavelength exceeds a predefined second threshold value as a fire occurrence time, and by determining a time when the calculated amount of change of the slope of the wavelength value ratio exceeds a predefined third threshold value as a fire occurrence time.

10. The method of claim 9, wherein the fire occurrence time determination operation comprises determining the fire occurrence time when only one of the average value of the first wavelength, the average value of the second wavelength, and the wavelength value ratio exceeds the first, second, and third threshold values.

11. The method of claim 9, further comprising an operation of performing at least one of output of a fire occurrence signal and a guidance to a user when the occurrence of fire is detected in the fire detection operation.

12. The method of claim 9, wherein the fire feature extraction operation comprises:

defining a maximum change value of the first wavelength and a maximum change value of the second wavelength comprised in the optical data, dividing the maximum change value of the first wavelength by an average value of the first wavelength to extract a maximum change value ratio of the first wavelength as a first fire feature, and dividing the maximum change value of the second wavelength by an average value of the second wavelength to extract a maximum change value ratio of the second wavelength as a second fire feature.

13. The method of claim 9, wherein the fire feature extraction operation comprises:

defining a maximum change value of the first wavelength and a maximum change value of the second wavelength comprised in the optical data, and extracting a time until a maximum change value time acquired by selecting the smaller among a time difference from the fire occurrence time to a time when the maximum change value of the first wavelength occurs and a time difference from the fire occurrence time to a time when the maximum change value of the second wavelength occurs as a third fire feature.

14. The method of claim 9, wherein the fire feature extraction operation comprises:

defining a maximum change value of the first wavelength and a maximum change value of the second wavelength comprised in the optical data, and differentiating an average value of the first wavelength and an average value of the second wavelength comprised in the optical data to extract a stabilization time, which is a time when an amount of change of a slope is smaller than a predefined slope threshold value, as a fourth fire feature.

15. The method of claim 9, wherein the fire feature extraction operation comprises:

defining a maximum change value of the first wavelength and a maximum change value of the second wavelength comprised in the optical data, and extracting a maximum change value of a wavelength value ratio calculated by differentiating a wavelength value ratio, which is a ratio of an average value of the second wavelength to an average value of the first wavelength comprised in the optical data, as a fifth fire feature.

16. The method of claim 9, further comprising an operation of configuring a data set for learning and inference with a feature extracted in the fire feature extraction operation.

* * * * *